United States Patent [19]

Lanham et al.

[11] Patent Number: 5,040,974
[45] Date of Patent: Aug. 20, 1991

[54] INTERNAL AIR CIRCULATION SYSTEM FOR LANHAM OVEN

[75] Inventors: William E. Lanham, Conyers, Ga.; Bill Kehl, Dubuque, Iowa

[73] Assignee: APV Baker Inc., Atlanta, Ga.

[21] Appl. No.: 499,953

[22] Filed: Mar. 27, 1990

[51] Int. Cl.⁵ .......................... A21B 1/42; F27D 7/04; F27B 9/00
[52] U.S. Cl. .................................. 432/121; 432/152; 432/133; 34/207; 34/216; 34/219; 34/229; 34/230
[58] Field of Search ................ 34/216, 219, 218, 229, 34/230, 207, 208; 432/133, 121, 152

[56] References Cited

U.S. PATENT DOCUMENTS

| | | | |
|---|---|---|---|
| 2,002,170 | 5/1935 | Barozzi | 34/222 X |
| 2,846,961 | 8/1958 | Nelson | 34/208 X |
| 3,497,965 | 3/1970 | Cortellessa | 34/216 |
| 3,534,393 | 10/1970 | Bickham et al. | 34/216 X |
| 4,235,023 | 11/1980 | Best | 432/152 X |
| 4,472,887 | 9/1984 | Avedian et al. | 432/152 X |
| 4,514,167 | 4/1985 | Royer | 432/152 X |
| 4,556,043 | 12/1985 | Bratton | 34/218 X |
| 4,631,029 | 12/1986 | Lanham et al. | 34/207 X |
| 4,752,216 | 6/1988 | Hurrell | 432/152 X |
| 4,834,646 | 5/1990 | Terashima | 432/152 X |
| 4,846,647 | 7/1989 | Stewart et al. | 432/72 X |
| 4,941,823 | 7/1990 | Ross | 432/152 |

*Primary Examiner*—Henry A. Bennet
*Assistant Examiner*—Christopher Kilner
*Attorney, Agent, or Firm*—Pasquale A. Razzano

[57] ABSTRACT

A bakery oven of the type employing a continuous conveyor therein for carrying goods to be baked through an oven enclosure includes an air distribution system adapted to direct heated air from near the top wall of the oven enclosure to the bottom and sides thereof. The air distribution means includes a fan mounted on the top wall of the oven which includes at least one fan blade located within the oven enclosure, a fan shaft secured to the fan blade and extending through the enclosure top. The fan shaft is mounted on the top of the oven for rotation and is driven by a separate motor also mounted on the top of the enclosure in spaced relation to the shaft. A drive belt is provided to transmit rotary power from the motor to the shaft. As a result, the shaft is fully exposed for air cooling and heat from the interior of the oven is not transmitted to the motor.

6 Claims, 5 Drawing Sheets

INTERNAL AIR CIRCULATION SYSTEM FOR LANHAM OVEN

The present invention relates to a commercial bakery oven, and more particularly to an air distribution system for a bakery oven.

BACKGROUND OF THE INVENTION

Conventional bakery ovens such as are disclosed, for example, in U.S. Pat. Nos. 3,680,493; 4,514,167; and 4,726,766; generally consist of an oven enclosure defining an interior oven space containing a spiral conveyor which passes through several flights within the oven space in a generally circular or rectangular path of travel. These systems carry the bakery goods through the same path of travel in an attempt to expose the goods being baked to the same baking conditions so that each item receives the same degree and character of baking. The goal of such ovens is to achieve uniform baking of the goods.

In order to improve the uniformity of baking within ovens of this type it has previously been proposed, for example, as disclosed in U.S. Pat. Nos. 4,544,352 and 4,631,029 to utilize air distribution systems within the oven. Such systems create more uniform baking patterns by decreasing the stratification of heat within the oven enclosure. These systems generally required the use of complex air supply and ducting systems, in order to redistribute hot air from the top area of the oven to the various flights of the conveyor. The complex ducting requirements lead to additional expense in the manufacture of the oven.

It is an object of the present invention to provide an improved oven for bakery products with an improved air distribution system avoiding the drawbacks of the prior art.

Another object of the present invention is to provide an oven for baking bread, rolls, or other bakery goods, in which the bakery goods are subjected to substantially uniform baking conditions throughout their journey through the oven.

Yet another object of the invention is to provide a bakery oven which will minimize fuel consumption for the oven burners and also reduce stratification of heat within the oven.

A further object of the invention is to provide and air distribution system in which the elements within the heated atmosphere of the oven are isolated from the drive motor. Therefore, heat from the oven does not affect the motor.

According to an aspect of the present invention, a baking oven is provided which includes an oven enclosure having top, side and end walls. A conveyor of conventional construction is provided within the enclosure for transporting bakery goods to be baked therein. Heating elements are provided within the oven in order to bake the goods on the conveyor.

A fan is mounted on the top wall of the oven for distributing heated air from adjacent the top of the enclosure to the bottom and sides thereof, thereby to provide a generally uniform heat distribution within the oven enclosure. The fan includes a large diameter fan blade having a high pitch located within the enclosure near its top. The blade is connected to a fan shaft which extends through the top wall of the enclosure to a frame in which the shaft is rotatably mounted. A drive motor is also mounted on the frame at a spaced location from the shaft and is connected to the shaft by a belt drive transmission, thereby to provide rotary power from the motor to the shaft. As a result the relatively large diameter fan blade distributes air from the top of the oven to the bottom and sides thereof while heat from the oven is isolated from the motor.

The above, and other objects, features and advantages of this invention will be more fully understood from the ensuing detailed description of a preferred embodiment when considered in connection with the accompanying drawings wherein.

Figure 1:
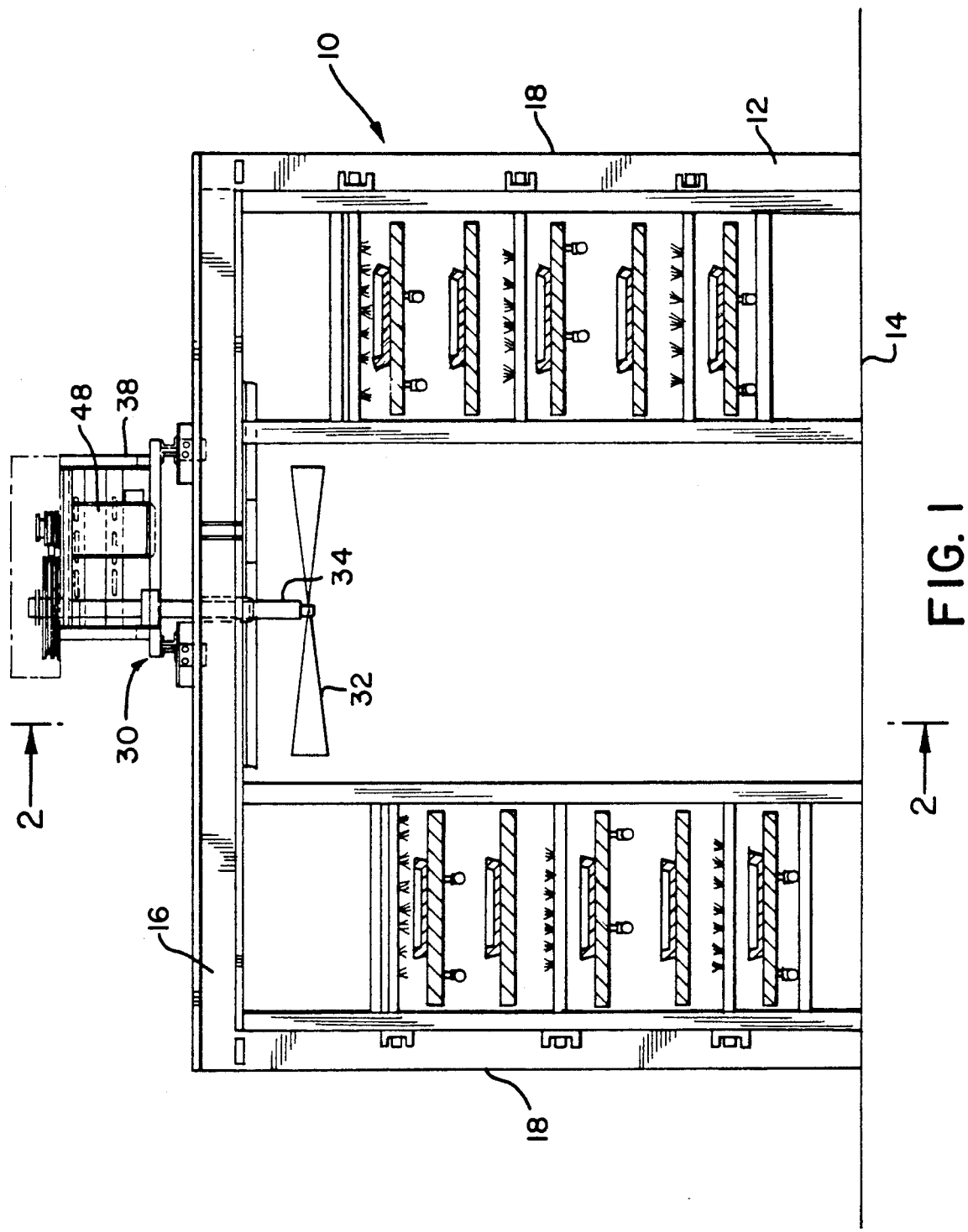
FIG. 1 is a cross sectional view through a bakery oven constructed in accordance with the present invention.
Figure 2:
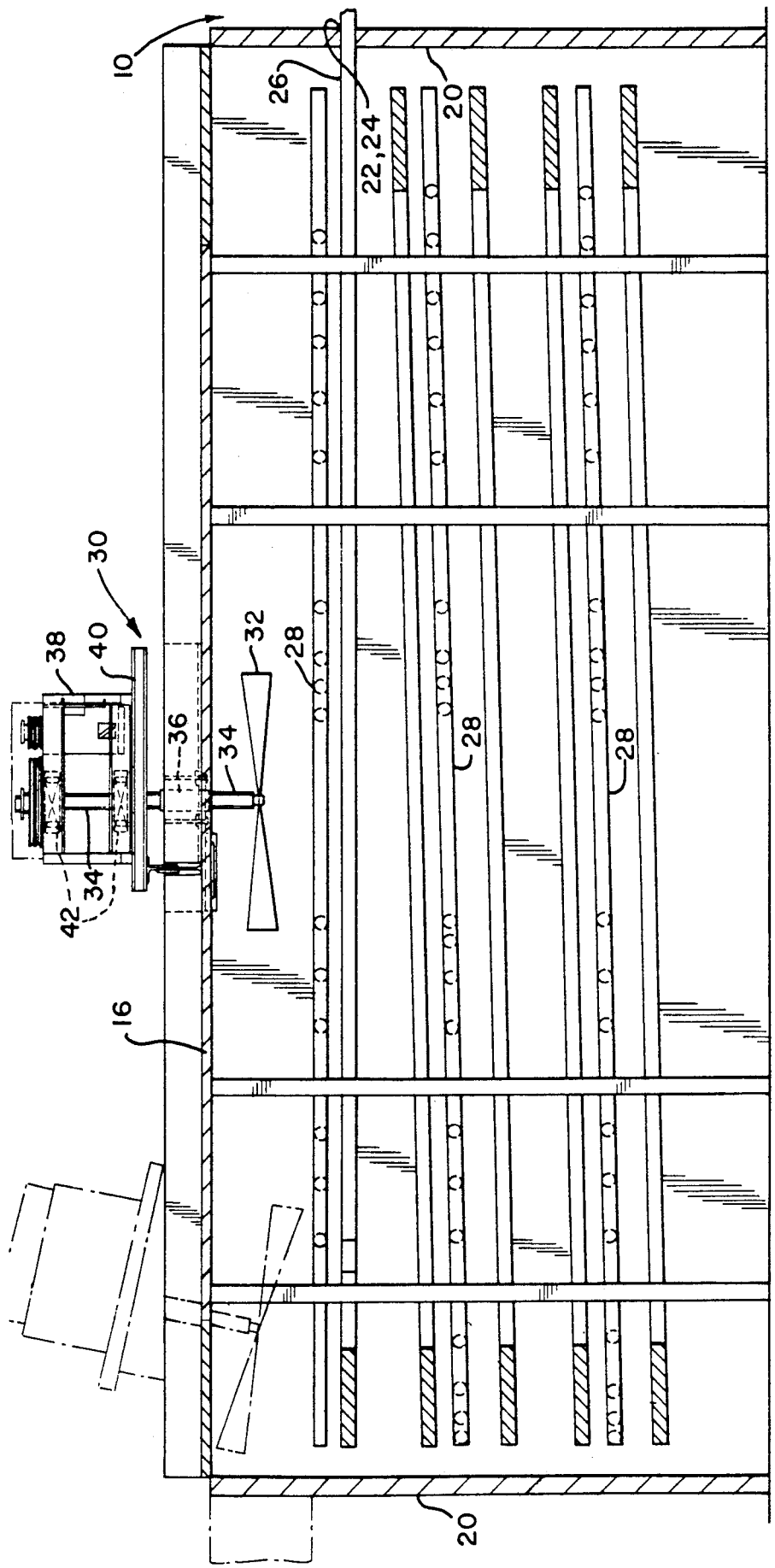
FIG. 2 is a longitudinal sectional view taken along line 2—2 of FIG. 1.
Figure 3:
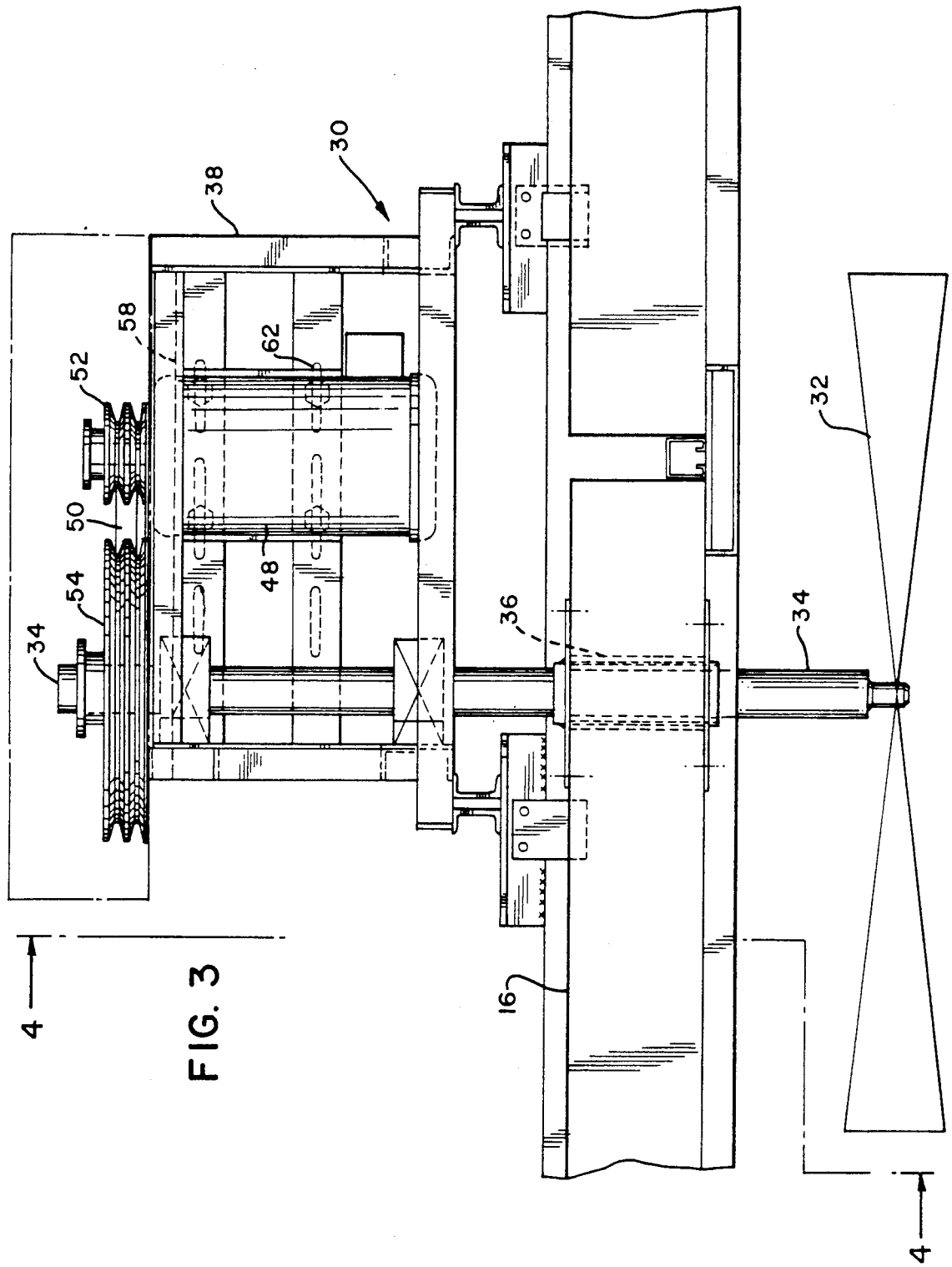
FIG. 3 is an enlarged side view of the fan and motor mounting arrangement shown in FIG. 1.

Referring now to the drawings in detail, and initially to FIGS. 1 and 2 thereof, a baking oven 10 constructed in accordance with the present invention includes an oven enclosure 12 constructed generally in the form of a rectangular parallelepiped having a floor 14, a top wall 16, side walls 18 and end walls 20. These walls are generally insulated in the usual manner.

One of the end walls of the oven has inlet and outlet openings 22, 24 formed therein through which portions of an endless conveyor 26 extend. This conveyor may be of the general type disclosed for example in U.S. Pat. No. 3,478,705, the disclosure of which is incorporated herein by reference. The conveyor carries the bakery goods along a more or less spiral path within the oven 10, so that each bakery good, e.g. each loaf of bread or roll, etc., traverses exactly the same path within the oven. As a result, all of the products receive substantially the same amount and same degree of baking.

Heating elements 28 are provided within the oven enclosure in any known manner. As illustrated in the drawings, these heating elements are provided in accordance with the disclosure of U.S. Pat. Nos. 3,589,307 and 4,631,029 so as to be located between alternate tiers or flights of the conveyor run. These heating elements are gas burners and can be arranged in generally parallel pairs along and beneath the tiers of the conveyor flights. The burners may also be arranged to extend parallel to the flights of the conveyor or at angles thereto, as is known in the art.

A feature of the present invention is the air distribution system 30 mounted at the top of the oven enclosure. This air distribution system includes a fan blade 32 located within the interior of the oven. This fan blade preferably is a single thirty-six inch (36") diameter high-pitched poultry-type fan blade. The blade is fixed to a two inch diameter drive shaft 34 which is rotatably mounted in a sleeve or collar 36 in the top wall 16 of the oven.

Figure 4:
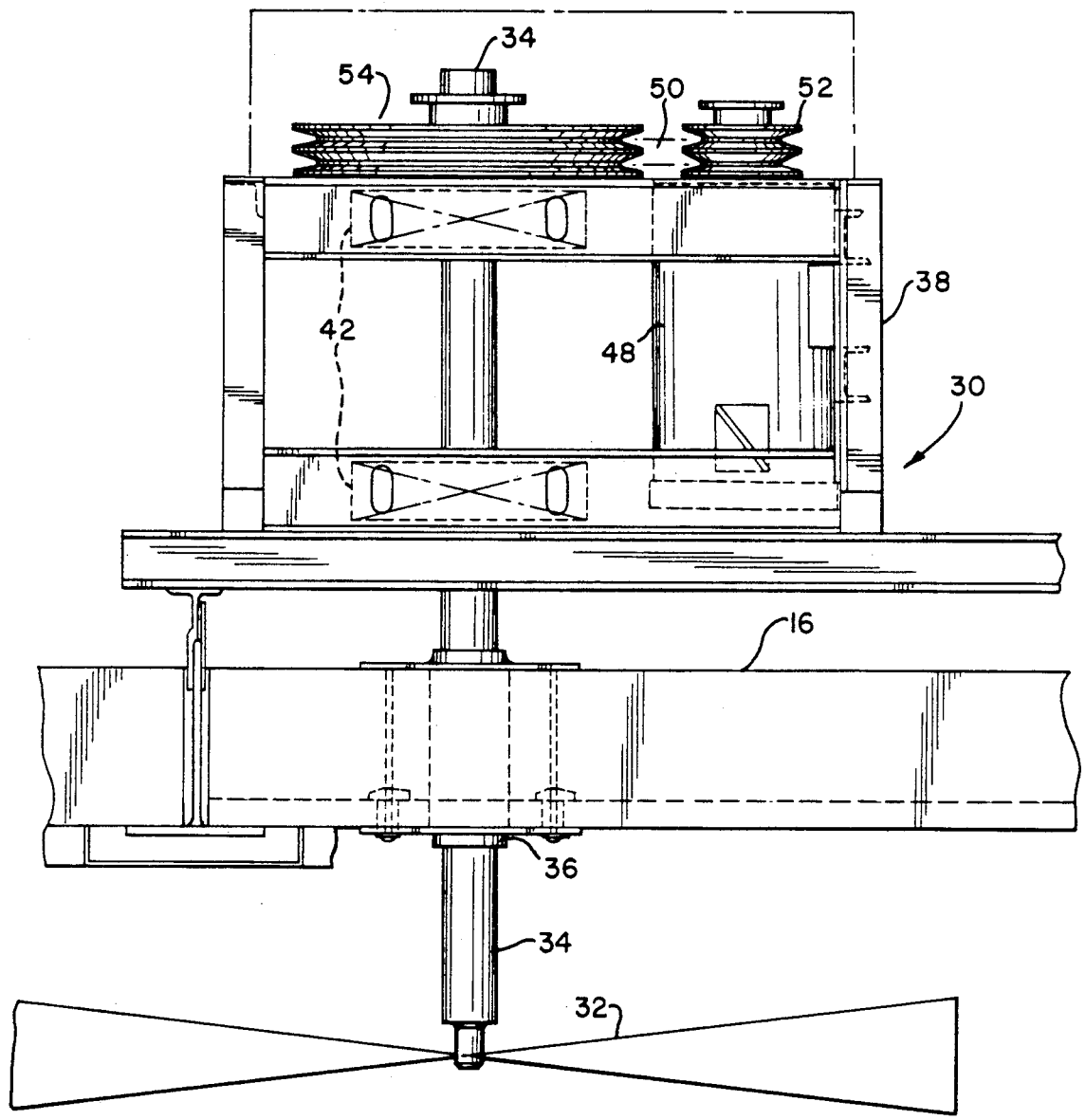
FIG. 4 is a side view of the fan and motor mounting shown in FIG. 3, taken along line 4—4 of FIG. 3.
Figure 5:
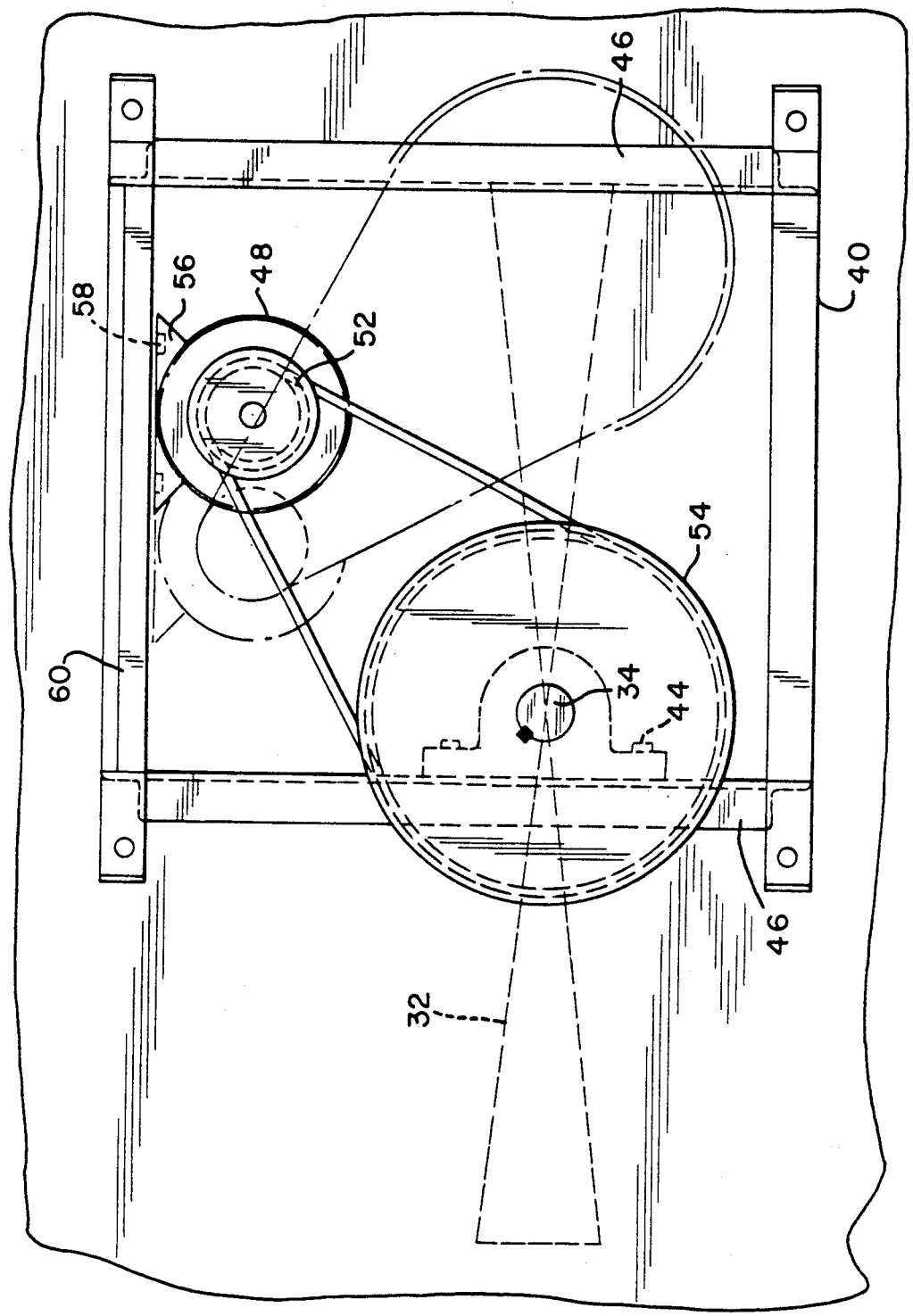
FIG. 5 is a top plan view of the motor mounting arrangement shown in FIGS. 3 and 4.

A support frame 38 is mounted on top wall 16 and consists of a plurality of rigid frame members 40 defining a rectangular support grid, as seen in FIGS. 4 and 5. The shaft 34 is mounted for rotation in bushings 42 secured on the frame 40. These bushings are mounted on the frame by bolts 44 so that the position of the bushings may be reversed. That is, the bushings may be mounted on the cross bars 46 or the cross bars 48 of the frame 40 as desired. This will enable the position of the fan blade within the oven to be slightly modified along the center line of the oven. Of course, a corresponding sleeve or collar 36 is provided in top wall 16 when the fan blade position is altered in this way.

By mounting the fan shaft in this way, substantially the entire length of the shaft is exposed to the air above the oven for air cooling. Thus, the heat within the oven to which the fan blade 32 and a lower end of the shaft 34 is exposed is dissipated in the air.

Fan shaft 34 is driven from an electric motor 48 through a double belt transmission system 50. This system includes a double belt, or a double wide belt, and a pair of pulleys 52 mounted on the output drive shaft of the motor and a pair of pulleys 54 mounted on the top end of the fan blade shaft 34. Motor 48 is mounted in a clamp arrangement 56 which is secured by bolts 58 on support frame element 60. Bolts 58 extend through slots 62 in frame element 60 to enable the position of the motor to be adjusted, thereby to allow tightening of the fan belt. In addition, bolts 58 and slots 62 enable the position of the motor to be changed, as seen in FIG. 5, thereby permitting the position of the fan shaft to be changed as well.

Preferably, drive motor 48 is a two horsepower, three phase motor having a relatively low RPM in the range of from 500 to 900 RPM (revolutions per minute). It has been found that by providing a large diameter fan blade with a high pitch and a relatively slow RPM motor, proper air flow can be provided to distribute hot air from the top of the oven to the bottom and laterally through the conveyor flights in order to properly "color" the products on the baking trays. As mentioned, with the fan shaft mounted through the roof of the oven air circulation around it will keep it cool. As a result no shaft cooler such as has been previously required in bakery ovens is needed.

Depending upon the size of the oven enclosure, more than one fan may be utilized. Preferably these fans are all located along the center line of the long dimension of an enclosure.

With fans located adjacent the end walls of the oven, it has been found desirable to mount the fan shaft at an angle to the end wall so that the plane of rotation of the fan blade lies at an angle of about 15° to the horizontal, as illustrated in FIG. 2. With this arrangement, the air flow will be directed downwardly against the side walls and through the end curves of the conveyor, assuring proper distribution at that section of the oven housing. The fan thus distributes air from the top of the oven and blows it down towards the floor of the enclosure so that the air can then recirculate back up through the conveyor where the baking trays are travelling, thereby to increase the heat transfer rate. The air then returns to the fan along the side walls of the oven to start the cycle over again.

The construction of the present invention adds to a uniform baking process for the finished product leaving the oven. It provides for more efficient use of the heat in the oven and a reduced cost in operation and maintenance.

Although a preferred embodiment of the present invention has been described herein in connection with the accompanying drawings, it is to be understood by those skilled in the art that various changes and modifications may be affected therein without departing from the scope or spirit of this invention.

We claim:

1. A baking oven comprising an oven enclosure having a top and side walls, a conveyor in said enclosure for transporting baking goods to be baked therein; means in said oven for heating the air therein for baking the bakery goods on said conveyor; and fan means mounted on said top wall for distributing heated air directly from adjacent the top of the enclosure to the bottom and sides thereof in order to provide generally uniform heat distribution within said oven enclosure, said fan means including at least one exposed fan blade located within said enclosure near the top thereof to draw hot air from near the top of the enclosure and direct it downwardly, a fan shaft secured to said fan blade and extending through said enclosure top; means on said enclosure to for rotatably mounting said fan shaft; a drive motor mounted on said enclosure top for driving said fan shaft, aid motor being spaced from said shaft, and drive belt means for transmitting rotary power from aid motor to said shaft, whereby the shaft is air cooled and heat from the interior of the oven is not transmitted to said motor; said means for rotatably mounting said fan shaft including a support frame for said shaft and said motor an means for selectively mounting said fan shaft in a plurality of positions relative to the motor, frame and enclosure whereby the location of the axis of rotation of the shaft relative thereto may be selectively varied; and means for adjustably mounting said motor on aid frame for adjusting tension on said drive belt and accommodating adjustments to the position of said shaft.

2. The baking oven as defined in claim 1 wherein said shaft is mounted at a predetermined angle to the vertical and adjacent one end of the enclosure.

3. The baking oven as defined in claim 2 wherein said predetermined angle is selected such that the fan blade is inclined at about 15° from the horizontal and directs heated air downwardly and towards the adjacent end wall of the enclosure.

4. A baking oven as defined is claim 2 including a plurality of said fan means mounted along the center line of the enclosure.

5. A baking oven as defined in claim 1 wherein said fan has an RPM output of between 500 and 900.

6. A baking oven as defined in claim 1 wherein said fan blade is a 36 inch diameter high pitched blade.

* * * * *